United States Patent
Möller

[11] Patent Number: 6,003,835
[45] Date of Patent: Dec. 21, 1999

[54] DIAPHRAGM VALVE

[75] Inventor: Rudolf Möller, Gehrden, Germany

[73] Assignee: Mannesmann Aktiengesellschaft, Düsseldorf, Germany

[21] Appl. No.: 08/928,863

[22] Filed: Sep. 12, 1997

[30] Foreign Application Priority Data

Sep. 12, 1996 [DE] Germany .................... 196 38 965

[51] Int. Cl.⁶ ................................................. F16K 31/126
[52] U.S. Cl. .................... 251/61.1; 251/331; 251/367
[58] Field of Search .................... 251/61.1, 331, 251/367

[56] References Cited

U.S. PATENT DOCUMENTS

| | | | |
|---|---|---|---|
| 3,779,274 | 12/1973 | Kelly | 137/505 |
| 4,304,260 | 12/1981 | Turner et al. | 251/61.1 |
| 5,104,090 | 4/1992 | Grizzle et al. | 251/61.1 |
| 5,529,280 | 6/1996 | Satoh et al. | 251/331 |

FOREIGN PATENT DOCUMENTS

| | | | |
|---|---|---|---|
| 0 622 765 A1 | 11/1994 | European Pat. Off. | |
| 30 087 | 5/1959 | Finland | 251/61.1 |
| 2228974 | 12/1974 | France | F15C 3/04 |
| 1152583 | 8/1963 | Germany | 251/61.1 |
| 32 09 786 A1 | 9/1983 | Germany | B01F 15/00 |
| 32 19 146 A1 | 11/1983 | Germany | F16K 7/17 |
| 40 22 129 A1 | 1/1992 | Germany | F16K 7/17 |
| 44 44 782 A1 | 6/1996 | Germany | F16K 7/12 |
| 62-127583 | 6/1987 | Japan | F16K 7/17 |
| 04216220 | 12/1990 | Japan | |
| 175 550 | 6/1961 | Sweden | 251/61.1 |
| 606 878 | 11/1978 | Switzerland | F16K 7/17 |
| 2 029 000 | 8/1979 | United Kingdom | F16T 1/02 |
| 2 253 503 | 11/1991 | United Kingdom | |

OTHER PUBLICATIONS

"Ventile Typ 740", Mannesmann Rexroth Preumatkik GmbH, Nov. 1994, 4 pp.

*Primary Examiner*—A. Michael Chambers
*Attorney, Agent, or Firm*—Cohen, Pontani, Lieberman & Pavane

[57] ABSTRACT

A diaphragm valve includes a diaphragm with a rigid insert. The diaphragm is arranged over a valve seat. The diaphragm is clamped concentrically around said valve seat. The combination of the rigid insert and the clamp enable a pressure applied an area of said diaphragm outside said clamped area to be communicated to the area of the diaphragm inside said clamped area, thereby closing or opening said valve seat.

12 Claims, 1 Drawing Sheet

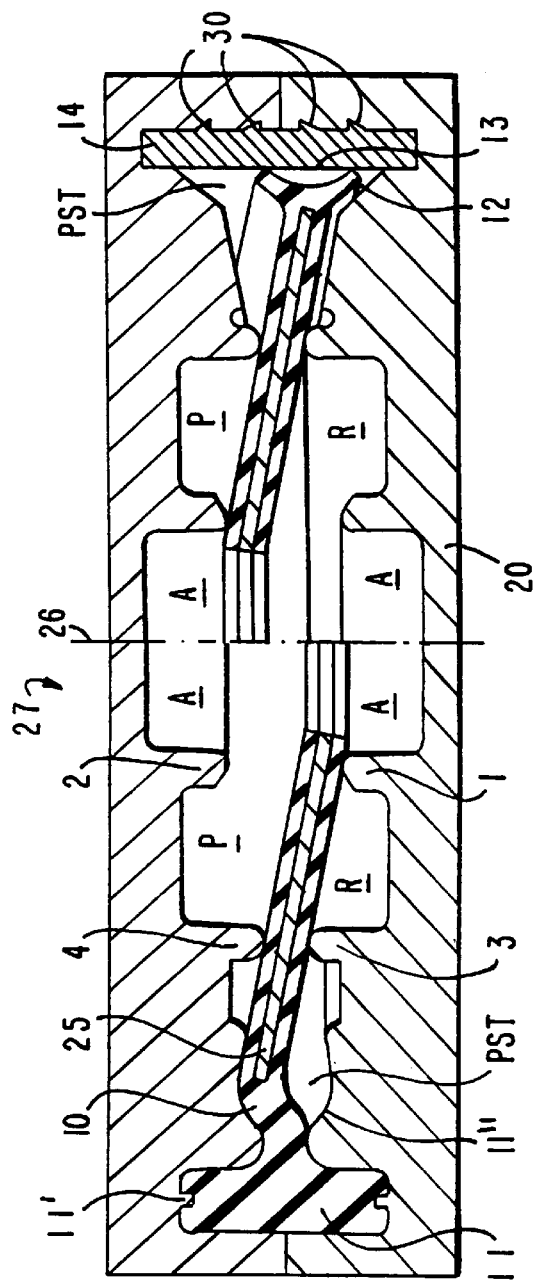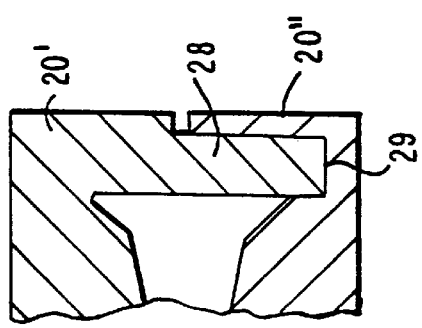

DIAPHRAGM VALVE

BACKGROUND OF THE INVENTION

1. Field of the Invention

The invention is directed to a diaphragm valve in which at least one circular valve seat is arranged within a housing and which can be actuated by a diaphragm-like actuating element so as to open from the valve seat or close on the valve seat.

2. Description of the Related Art

Valves of this kind are known as diaphragm valves because the actual valve element is a flexible diaphragm. Strictly speaking, these valves are known as diaphragm seat valves. In view of the fact that the valve element is a diaphragm, such valves are naturally constructed in a flat manner. Often, a plurality of such valve seats and consequently also a plurality of diaphragms are accommodated within such valves. These can be discrete component parts which are actuated individually and which are accordingly separate or they can be integrated in one piece, depending on the desired directional valve function. To achieve a corresponding valve function, two valves are usually necessary, on which valves two diaphragms or two diaphragm portions can be actuated. Because the diameter of the valve seats is necessarily large, the resulting valve has correspondingly wide dimensions.

SUMMARY OF THE INVENTION

It is an object of the present invention to change the constructional form in a diaphragm valve with respect to the valve seats and the diaphragm such that the valve can be constructed not only in a flat manner, but also in a short and considerably more compact way.

The present invention includes a first valve seat-like diaphragm clamp on both the upper and lower sides of the diaphragm. The clamp is disposed concentrically around the inner actual valve seat. Consequently, it is now possible to use only one individual diaphragm as an actuating element: Also, this diaphragm does not require a specially fashioned valve lifter coupling. Rather, the diaphragm is correspondingly moved between the corresponding valve seats due to a lever action about the clamping point which acts as a fulcrum. In addition, the diaphragm must be upset slightly with respect to its geometric dimensions with reference to the housing clamping in the edge region.

In one embodiment of the invention, the diaphragm is constructed so as to be thicker in the area of its rim and is accordingly clamped in an undercut in the housing. This means that the diaphragm rim is correspondingly clamped along the entire outer circumference in this embodiment. Immediately inwardly adjacent to this diaphragm rim clamping, the valve housing has two circumferential dome-shaped rotationally symmetrical surfaces which are located opposite one another and which extend so as to be symmetrical with respect to rotation and concentric with respect to the valve seats. The diaphragm will insert itself in a curved manner into the dome shaped surfaces when actuated. As a result of the concavity of these dome-shaped surfaces, a lever force is ultimately exerted on the diaphragm when considered in cross section relative to the diaphragm. The concentric diaphragm clamp, mentioned above, is located between the dome-shaped surface and the inner valve seat. This double diaphragm clamp acts as a fulcrum or fulcrum line of the diaphragm with respect to the lever action described above. This lever action brings about a transmission of force to the diaphragm generating a corresponding curvature, so that the diaphragm either abuts against one or the other of the valve seats. The stationary clamping of the rim of the diaphragm represents a first embodiment of the invention.

In a second embodiment, the diaphragm has two circumferential sealing lips in the rim area and is not clamped in a stationary manner in the rim area. Rather, the rim area of the diaphragm is arranged to be displaceable along a sleeve which extends concentrically around the outside of the valve seat. In both the first embodiment with the dome-shaped surfaces and the second embodiment with the sealing lips, the movement of the diaphragm results in the formation of pressure spaces in front and behind the valve seat-like diaphragm clamp. The pressure spaces also curve the diaphragm and thus accordingly actuate the diaphragm in a corresponding manner. In short, actuation is no longer effected via a stroke or lift of a rigid actuating element. Rather, actuation is effected by applying pressure to a specific area of the diaphragm, resulting in a curvature which in turn brings about a corresponding contact with or lifting off from the aforementioned concentric valve seat.

The diaphragm is strengthened by a reinforcing or rigid insert. This insert is what makes the force transmission from the outer switching area to the valve seat area possible. This insert is advantageously constructed so as to be closed annularly in the clamping region and in the region of the valve seats. In other words, the diaphragm is not curved over the entire diameter when actuated. Instead, there is formed in the region around the clamping point of the diaphragm, a rigid lever. The center of the diaphragm is capable of curving.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

In the drawings:

FIG. 1 is a cross-sectional view showing a diaphragm valve according to the present invention; and FIG. 2 is a partial cross-sectional view of an end portion of another embodiment of the diaphragm valve according to the present invention.

DETAILED DESCRIPTION OF THE PRESENTLY PREFERRED EMBODIMENTS

Referring to FIG. 1, diaphragm valve 27 is arranged around an axis of symmetry 26 in a rotationally symmetrical manner. Valve seats 1, 2 and diaphragm clamps 3, 4 are arranged concentrically. In addition, control chambers $P_{ST}$ for actuating the movement of the diaphragm 10 are arranged at an outer circumference of diaphragm 10. One or both of valves seats 1, 2, located opposite one another on either side of diaphragm 10, is or are circular. Pressure chambers $P_{ST}$ are also toroidal, in that they extend in a rotationally symmetrical manner around axis of symmetry 26 shown in the drawing.

Although the preferred embodiment discloses a rotationally symmetric valve, the advantages of this invention can be realized with a non-symmetric arrangement. For instance, the control pressure chamber could be arranged next to the valve seat with the diaphragm clamps located therebetween.

FIG. 1 shows two possible embodiments of diaphragm valve 27. Shown on the left-hand side of FIG. 1 is diaphragm 10 according to the first embodiment, namely, with a fixed or stationary rim clamping. The right-hand side of FIG. 1 shows a second embodiment in which diaphragm 10 has a loose displaceable rim clamping. In the second embodiment, sealing lips 12 are necessary and are provided therein.

In addition to showing different embodiments, the left-hand side of FIG. 1 shows a different switching position than that shown on the right-hand side. Thus, in the first embodiment, diaphragm 10 is curved downward and in the second embodiment, diaphragm 10 is curved upward.

In both cases, diaphragm 10 is a circularly closed disk reinforced with an insert 25. Insert 25 is positioned within diaphragm 10 and made of a rigid or semi-rigid material which enables the movement of diaphragm 10 in response to pressure exerted at the respective pressure chamber $P_{ST}$ to be transferred to the portion of diaphragm 10 at valve seats 1, 2 by pivoting diaphragm 10 about diaphragm clamps 3, 4. Because insert 25 is a rigid material, it acts as a lever.

In the first embodiment, on the left-hand side of FIG. 1, an H-shaped enlargement 11 in the rim area of diaphragm 10 is, in the assembled state, fixed and inserted in a sealing manner in a corresponding recess or undercut contour 11' of housing 20. Adjacent to the outer circumference of housing 20 is control chamber $P_{ST}$ which has a dome-shaped contour 11''. Diaphragm 10 is tightly inserted into this region and pressed against the dome-shaped contour 11'' when acted upon by a suitable pressure medium. This actually brings about the curvature or radial flipping-over or tilting movement of diaphragm 10 and a corresponding force for closing diaphragm 10 on valve seats 1 or 2 is generated. In the first embodiment, the lower control chamber $P_{ST}$, which is separated from the upper control chamber by diaphragm 10, is pressurized. By applying pressure to the lower control chamber $P_{ST}$, a corresponding curvature is produced. As stated above, diaphragm 10 is fixedly clamped between two diaphragm clamps 3, 4. Diaphragm clamps 3, 4 are like a fulcrum of the acting lever. The lever action is transmitted to diaphragm 10 in the direction of the center such that diaphragm 10 closes the air relief R at the valve seat 1 or 2 and vents the pressure medium space P from outside of the inner valve seat 1 or 2 to the pressure medium space inside the valve seat 1 or 2 and into the working line A which feeds into that space.

In addition to the different rim clamping of diaphragm 10, the opposite switching position is also shown in the right-hand half of FIG. 1. Because the upper control space or chamber $P_{ST}$ is pressurized instead of the lower chamber, the lever action results in diaphragm 10 being moved upward. Consequently, the space into which pressure medium supply P feeds is separated from the pressure medium space that opens into the working line A, while working line A is opened at the lower valve seat 1, 2 for venting.

The position of diaphragm 10 shown on the right is achieved when upper control chamber $P_{ST}$ is pressurized, and the peripheral portion of diaphragm 10 contacts the lower dome-shaped portion of the housing 20.

The right-hand half of the drawing also shows the second embodiment of the invention in which the rim of diaphragm 10 is displaceable rather than stationary. It is necessary in this case that diaphragm 10 is provided in the rim area with circumferentially extending sealing lips 12. Further, the outer stop of the control chambers must have a continuous, uninterrupted, seamless surface 13 along which sealing lips 12 can slide in a sealable manner. This is effected by a sleeve 14 which is concentric around the axis of symmetry 26. Sleeve 14 contains, along the actuating path, a continuous seamless surface 13. Sleeve 14 is required when the housing is formed of two parts in the manner shown herein, namely, an upper part and a lower part which produce a seam in the center when joined. Sleeve 14 may also include, on the side opposing seamless surface 13, claw members 30 or the like for fastening the separate portions of housing 20 together.

As shown in FIG. 2, the housing parts can also be formed in such a way that no seam will result in the active area of the outer seal of the diaphragm even though a two-part housing is used. In particular, this is achieved in that, e.g., the upper part 20' of housing 20 has a projection 28 and a lower part 20'' of housing 20 has a corresponding groove 29, so that one can be inserted into the other when assembling housing 20. Projection 28 must be formed such that sealing lips 12 can slide over the seamless surface, as mentioned above, over the entire active region of diaphragm 10.

In conclusion, it should be made clear once again that the outer valve seat-like structure or diaphragm clamps 3, 4 in FIG. 1 are not valve seats in the conventional sense, since the two oppositely located diaphragm clamps 3, 4 tightly contact opposing sides of the diaphragm 10 in every switching position of diaphragm 10. The actual valve seats 1, 2 are between annular pressure chambers P and A. The valve seats 1, 2 are located opposite one another and at a distance from one another. However, for the sake of a simple presentation of the geometry, it is stated in the present text that diaphragm clamps 3, 4 extend annularly and therefore concentrically to the actual valve seats 1, 2.

The invention is not limited by the embodiments described above which are presented as examples only but can be modified in various ways within the scope of protection defined by the appended patent claims.

I claim:

1. A diaphragm valve, comprising:
   a housing;
   at least one valve seat disposed in said housing;
   a diaphragm having two opposing surfaces mounted in said housing, one of said two opposing surfaces resting against said valve seat;
   a pressure medium space concentrically surrounding said valve seat;
   a first control pressure chamber between said housing and one side of said diaphragm along an area of said diaphragm between said pressure medium space and a perimeter of said diaphragm;
   said first control pressure chamber being operable for moving said diaphragm by one of curvature actuation and radial flip-over actuation in response to a pressure medium in said first control pressure chamber such that said diaphragm moves away from said circular valve seat, thereby opening said valve seat.

2. The diaphragm valve of claim 1, wherein said first control pressure chamber is arranged in a toroidal manner around said at least one circular valve seat.

3. The diaphragm valve of claim 1, further including a second control pressure chamber on an opposing said of said diaphragm from said first control pressure chamber.

4. The diaphragm valve of claim 3, wherein said diaphragm comprises a projection along a perimeter of said diaphragm; and
   said housing includes a matching groove for receiving said projection such that said projection of said diaphragm is fixedly held in said matching groove of said housing.

5. The diaphragm valve of claim 3, wherein said diaphragm includes at least one sealing lip at a perimeter of said diaphragm;

said sealing lip being positioned said first control pressure chamber such that said diaphragm and sealing lip partition said first control pressure chamber and said second control pressure chamber; and said sealing lip being sealingly displaceable in a rim area of said housing during the movement of said diaphragm.

6. The diaphragm valve of claim 5, wherein a surface of said housing on which said sealing lip is displaced is constructed in one piece and in a seamless manner.

7. The diaphragm valve of claim 1, further comprising a second valve seat mounted in said housing on an opposing side of said diaphragm from said at least one valve seat.

8. The diaphragm valve of claim 1, further comprising:

two substantially circular diaphragm clamps arranged concentrically around said valve seat on opposing sides of said diaphragm;

said diaphragm being clamped between said diaphragm clamps such that said diaphragm is held in a stationary and sealing manner;

said diaphragm clamps being concentrically positioned at a distance from said valve seat;

an outer area of said diaphragm, outside of an inner area enclosed by said diaphragm clamps, opening into said control pressure chamber; and said first control pressure chamber being operable for applying a force to said outer area of said diaphragm for pivoting said diaphragm about said diaphragm clamps in response to said pressure in said first control pressure chamber.

9. The diaphragm valve of claim 4, wherein said control chamber includes a dome-shaped surface portion inwardly adjacent to said projection in which a corresponding portion of said diaphragm is positioned upon movement of said diaphragm.

10. The diaphragm valve of claim 1, wherein said housing comprises two parts, and additionally comprising an annular sleeve mounted within said housing at a perimeter of said diaphragm, said annular sleeve having one of claw members and fastening elements at an outer surface thereof for holding said housing parts together.

11. The diaphragm valve of claim 1, wherein said diaphragm rests against said at least one valve seat under pretension.

12. The diaphragm valve of claim 11, additionally comprising a stiffener providing insert within said diaphragm.

\* \* \* \* \*